Figures 1, 2, 3:
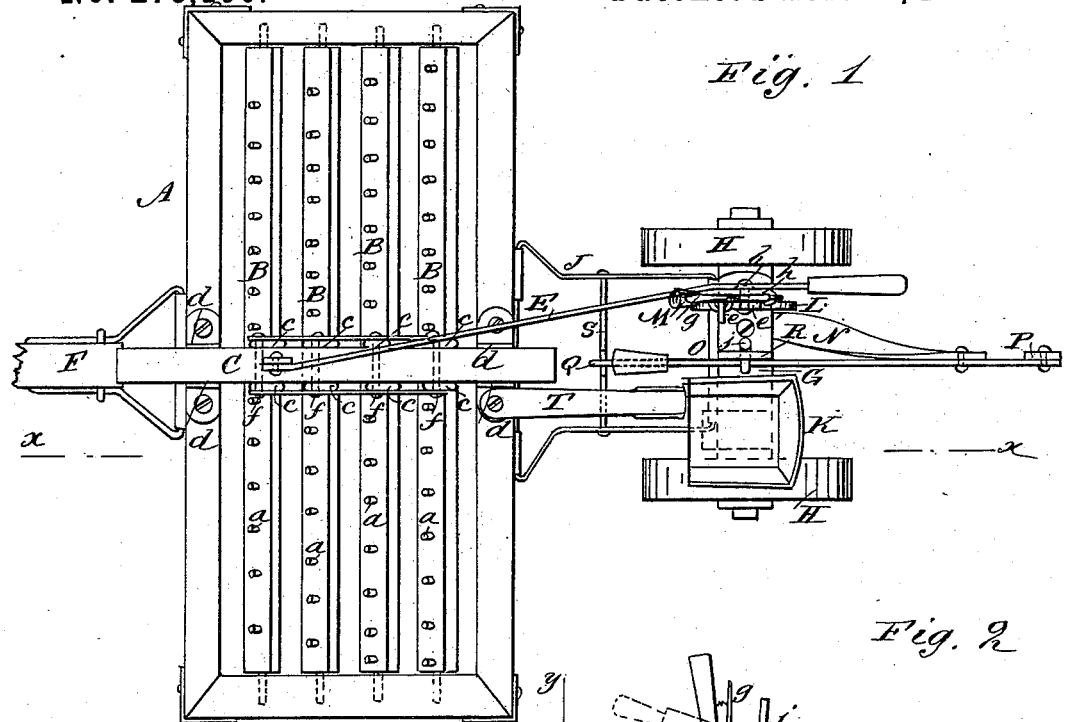

(No Model.)

T. VAN OSTRAND.
RIDING HARROW

No. 273,196. Patented Feb. 27, 1883.

WITNESSES:
C. Neveux
G. Sedgwick

INVENTOR:
T. Van Ostrand
BY Munn & Co
ATTORNEYS.

UNITED STATES PATENT OFFICE.

THOMAS VAN OSTRAND, OF KINSLEY, KANSAS.

RIDING-HARROW.

SPECIFICATION forming part of Letters Patent No. 273,196, dated February 27, 1883.

Application filed July 14, 1882. (No model.)

*To all whom it may concern:*

Be it known that I, THOMAS VAN OSTRAND, of Kinsley, in the county of Edwards and State of Kansas, have invented a new and useful Improvement in Riding-Harrows, of which the following is a full, clear, and exact description.

My invention relates to improvements in riding-harrows; and it consists in the peculiar arrangement and construction of the parts, as hereinafter more fully set forth, and pointed out in the claims.

Reference is to be had to the accompanying drawings, forming a part of this specification, in which similar letters of reference indicate corresponding parts in all the figures.

Figure 1 is a plan view of my new and improved harrow. Fig. 2 is a sectional elevation of the same, taken on the line $x\ x$ of Fig. 1; and Fig. 3 is a section taken on the line $y\ y$ of Fig. 2, showing the riding-truck and lever mechanism in front elevation.

A represents a rectangular frame, in which are pivoted the harrow-beams B B, which carry the harrow-teeth $a\ a$. These beams are adapted to be turned upon their pivots for holding the teeth $a\ a$ in different positions or angles, to increase their effectiveness while in use and to free them from trash. The means I prefer for turning the said beams upon their pivots consist of the longitudinally-movable cross-piece C, attached to the harrow-beams by the eye plates or bars $c\ c$, which are hinged to the sides of the cross-piece upon the rods $f\ f$, the connecting rod or lever E, attached to the top of the cross-piece, and the lever M, attached to the truck. The cross-piece C is held between the upwardly-projecting pieces $d\ d$, secured to the frame A, which act as guides to the cross-piece and permit its longitudinal movement, and the forward end of the cross-piece is by preference beveled upwardly, and is extended in front of the frame A, as shown in Figs. 1 and 2, so as to come over the rear end of the tongue F, which is hinged to the frame, so that when the cross-piece C is carried forcibly forward its forward end will impinge upon the tongue and cause the forward part of the harrow to be raised from the ground.

G represents the axle, and H H the wheels, of the truck. The axle is hinged to the rear of the frame A by means of the frame J.

Secured upon the upper side of the axle G, to the right of the seat K, is the rack L, to which the aforesaid lever M is pivoted upon the pin $b$. To this lever M is connected, by means of the claw-plate $h$, the aforesaid connecting rod or lever E, coming from the cross-piece C. The claw-plate $h$ is adapted to slide upon the lever M, for adjusting the height of the rear or outer end of the connecting rod or lever E, for increasing or diminishing the forward movement or thrust of the said connecting rod or lever and the said cross-piece C. The claw-plate $h$ may be held at any position upon the lever M, for holding the rod E at any desired position, by means of the spring catch or lever $g$, the bent lower end of which passes through one of a series of holes, $a'$, (see Fig. 3,) in the claw-plate, and engages with a notch made in the edge of the lever M, as shown in dotted lines in Fig. 2.

Secured to the rear side of the axle G is the upwardly and rearwardly extending arm N, to which is pivoted the lever O, which is linked at its outer end by the link P to the rear end of the lever Q, which latter is fulcrumed upon the pin $i$, passing through the said lever, and the upright R, secured upon the upper side of the axle, the forward end of the said lever Q being attached to the frame J (which attaches the truck to the rear of the frame A) by means of the cross rod or bail S, pivoted at its ends at or near the center of the side pieces of the frame J, as shown in Figs. 1 and 2. By this means, when the lever O is raised to the position shown in dotted lines in Fig. 2, the downward movement of the rear end of the lever Q will cause the forward end thereof to raise the frame J, and thus through this frame the rear side of the harrow. With the lever O in this elevated position, if it is desired to raise the harrow entirely out of contact with the ground, it is only necessary to force forward the lever M, which will cause the forward end of the cross-piece C to come upon or against the rear end of the tongue F, and thus raise the forward side of the harrow, as above described. The lever O may be held in its elevated position by the spring-catch $j$, attached to the upper end of the upright R, and the lever M may be held in any desired position by means of the dog $e$ engaging with the notches $e'$ of the rack L, so that when the lever M is held forward and the lever O elevated the harrow will be carried entirely free from the ground, as will be clearly understood, for taking the harrow from field to field or to and from the field, or for turning the harrow around.

To let the harrow down for harrowing the ground, it will be understood that it is only necessary to force the spring-catch $j$ outward, thus letting the lever O drop to the position shown clearly in full lines in Fig. 2, which will lower the rear side of the harrow, and to draw the lever M backward, which will move the cross-piece C backward out of contact with the tongue, which will lower the forward part of the harrow. It will be seen that any longitudinal movement of the cross-piece C will, by reason of its connection with all of the harrow-beams B B, turn the harrow-beams upon their pivots one way or the other, according to the direction of movement of the cross-piece, and thus will vary the angle at which the harrow-teeth come in contact with the ground, and that the angle of the teeth may be easily changed, according to the varying conditions of the soil, by a slight movement of the lever M.

The seat K is attached to the upper horizontal portion of the bent spring-plate K', which plate is attached at its lower end to the front side of the axle, preferably in such manner that the line of direction of the weight of the person sitting in the seat will come in line with the axis of the axle, so that the weight of the driver will hold the axle from turning in the wheels when the harrow is raised.

The foot-rest T is secured to the rear bar of the frame A, for supporting the feet of the driver, and by means of this rest he is enabled to add a portion of his weight to the harrow, when desired or found necessary, for increasing the effectiveness of the harrow.

Having thus described my invention, I claim as new and desire to secure by Letters Patent—

1. The cross-piece C, extending in front of the frame A, in combination with the tongue F, connecting-rod E, and lever M, for raising the front of the harrow, as set forth.

2. The riding truck hinged to the frame A, in combination with the levers O and Q, link P, and cross-piece or bail S, for raising the rear side of the harrow, substantially as described.

3. The longitudinally-moving cross-piece C, attached to the harrow-beams and operated by the connecting rod or lever E and lever M, in combination with the tongue F, for raising the forward side of the harrow, and with the levers O and Q, link P, and bail S, and frame J, for raising the rear side of the harrow, as set forth.

4. The combination, with the pivoted harrow-beams B, cross-piece C, eye-plates $c$, and bolts $f$, of the rod E, lever M, provided with a notch, spring-lever $g$, and claw-plate $h$, sliding on said lever, and provided with a series of holes, $a'$, substantially as shown and described.

5. The combination, with the hinged frame J, of the levers Q and O, link P, upright R, and spring-catch $j$, substantially as described.

THOMAS VAN OSTRAND.

Witnesses:
L. G. BOIES,
NATHAN ROBERTS.